(12) United States Patent
Steinberg

(10) Patent No.: US 7,641,145 B2
(45) Date of Patent: Jan. 5, 2010

(54) APPARATUS FOR MOVING A CONTROL SURFACE

(75) Inventor: Timothy Alan Steinberg, Kentwood, MI (US)

(73) Assignee: Eaton Corporation, Cleveland, OH (US)

( * ) Notice: Subject to any disclaimer, the term of this patent is extended or adjusted under 35 U.S.C. 154(b) by 463 days.

(21) Appl. No.: 11/603,360

(22) Filed: Nov. 21, 2006

(65) Prior Publication Data

US 2008/0116317 A1    May 22, 2008

(51) Int. Cl.
*B64C 13/34*    (2006.01)
(52) U.S. Cl. ..................... 244/99.3; 74/500.5
(58) Field of Classification Search ............... 244/99.2, 244/99.3; 74/425, 500.5, 502.3, 502.4, 502.6
See application file for complete search history.

(56) References Cited

U.S. PATENT DOCUMENTS

| | | | | |
|---|---|---|---|---|
| 1,983,962 A | * | 12/1934 | Barber et al. ................. | 74/504 |
| 2,291,151 A | * | 7/1942 | Dunn .......................... | 192/38 |
| 2,586,359 A | * | 2/1952 | Mall ............................ | 464/53 |
| 4,637,272 A | * | 1/1987 | Teske et al. ................ | 74/89.26 |
| 6,076,767 A | * | 6/2000 | Farley et al. ................ | 244/78.1 |
| 6,443,034 B1 | * | 9/2002 | Capewell et al. ....... | 74/665 GA |
| 6,672,540 B1 | * | 1/2004 | Shaheen et al. ............ | 244/99.3 |
| 6,851,648 B2 | * | 2/2005 | Perni et al. ................. | 244/99.3 |
| 2007/0108343 A1 | * | 5/2007 | Wingett et al. ............. | 244/99.3 |

* cited by examiner

*Primary Examiner*—Michael Carone
*Assistant Examiner*—Michael Kreiner
(74) *Attorney, Agent, or Firm*—Tarolli, Sundheim, Covell & Tummino LLP

(57) ABSTRACT

An apparatus for use in moving a control surface during operation of an aircraft includes a flexible drive shaft to be connected with an actuator assembly by a coupling assembly. Operation of the actuator assembly operates a force transmission apparatus to move a control surface on an aircraft. The coupling assembly includes an input member connected with the flexible drive shaft and an output member which may be connected with the actuator assembly. A plurality of balls interconnect the input and output members and are rotatable to accommodate relative movement between the input and output members.

13 Claims, 4 Drawing Sheets

APPARATUS FOR MOVING A CONTROL SURFACE

BACKGROUND OF THE INVENTION

The present invention relates to an apparatus for use in moving a control surface during operation of an aircraft.

A known apparatus for use in moving a control surface during operation of an aircraft includes an actuator which is disposed on a wing of an aircraft and is connected with the control surface. A flexible drive shaft connects the actuator with a source of power. A coupling is provided between the flexible drive shaft and the actuator. This coupling has a polygonal cross sectional configuration.

To obtain relative movement between the actuator and the flexible drive shaft, a locking interaction at polygonal surfaces of the coupling must be overcome. However, the locking interaction at the polygonal surfaces of the coupling requires a relatively large force to effect relative movement between the actuator and the flexible drive shaft.

SUMMARY OF THE INVENTION

An improved apparatus for use in moving a control surface during operation of an aircraft includes a flexible drive shaft to be connected with an actuator assembly. A force transmission apparatus may be provided to transmit force from the actuator assembly to the control surface. A coupling assembly is provided to interconnect the flexible drive shaft and the actuator assembly.

The coupling assembly includes an input member which is connected with the flexible drive shaft. The coupling assembly also includes an output member which may be connected with the actuator assembly. A plurality of balls interconnect the input and output members and are rotatable to accommodate relative movement between the input and output members.

BRIEF DESCRIPTION OF THE DRAWINGS

The foregoing and other features of the invention will become more apparent upon a consideration of the following description taken in connection with the accompanying drawings wherein.

DESCRIPTION OF ONE SPECIFIC EMBODIMENT

Figure 1:
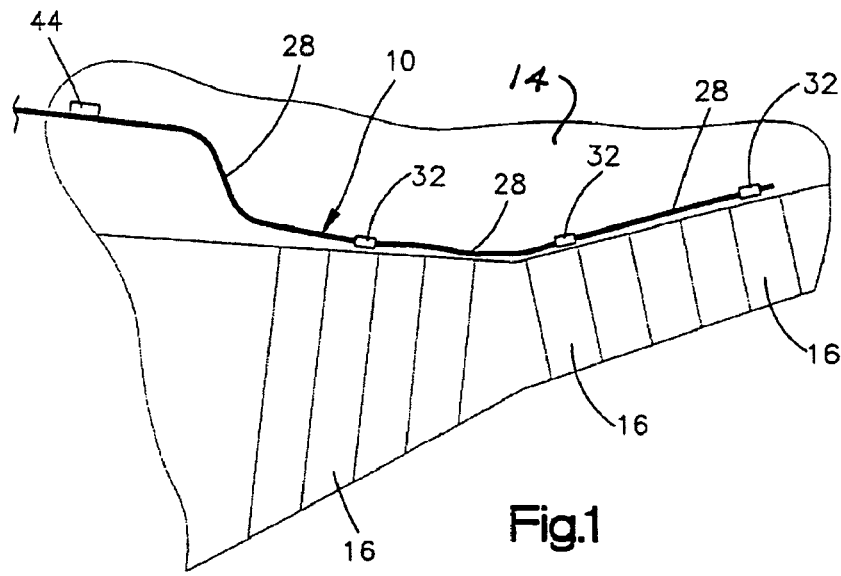
FIG. 1 is a fragmentary schematic illustration depicting the relationship between flaps adjacent a trailing edge of a wing of an aircraft and an apparatus for use in moving the flaps.
Figure 2:
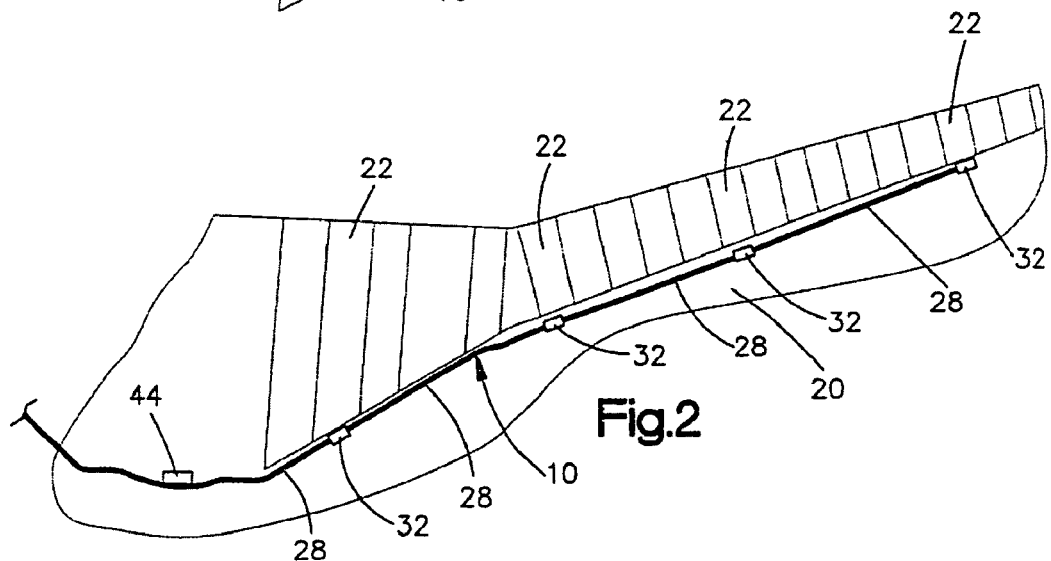
FIG. 2 is a fragmentary schematic illustration depicting the relationship between slats adjacent a leading edge of a wing of an aircraft and an apparatus for use in moving the slats.

An aircraft may have control surfaces on wings, a tail, or other portions of the aircraft. An apparatus 10 for use in moving a control surface on an aircraft during operation of the aircraft is illustrated in FIG. 1 in association with a trailing edge portion 14 of a wing and flaps 16 which are movably mounted adjacent the trailing edge portion of the wing. The apparatus 10 is illustrated in FIG. 2 in association with a leading edge portion 20 of a wing and slats 22 which are movably mounted adjacent the leading edge portion of the wing. It should be understood that the apparatus 10 may be utilized in association with control surfaces other than control surfaces on a wing of an aircraft.

Figure 3:
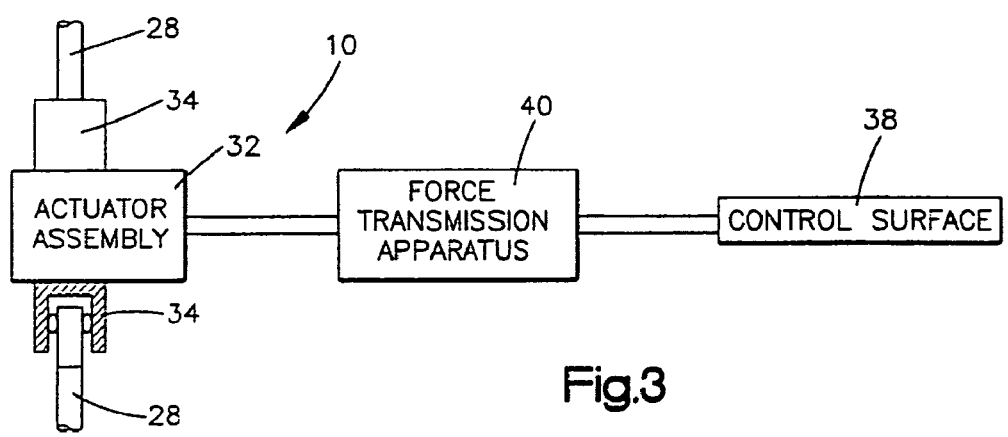
FIG. 3 is a schematic illustration of a portion of the apparatus of FIGS. 1 and 2 and illustrating the manner in which a flexible drive shaft is connected with an actuator assembly by a coupling assembly and the manner in which the actuator assembly is connected with a control surface by a force transmission apparatus.

The apparatus 10 includes a plurality of flexible shafts 28 (FIGS. 1 and 2) which are connected with a plurality of actuator assemblies 32 by coupling assemblies 34 (FIG. 3). Each of the identical actuator assemblies 32 is connected with a control surface 38, which may be a flap 16 (FIG. 1), slat 22 (FIG. 2), or other control surface, by a force transmission apparatus 40. A power drive unit 44 (FIGS. 1 and 2) is connected with the flexible drive shafts 28 and provides power to rotate the flexible drive shafts about their longitudinal central axes. Rotation of the flexible drive shafts 28 about their longitudinal central axes operates the actuator assemblies 32 and force transmission apparatus 40 to move control surfaces, such as the flaps 16 or slats 20.

Each of the flexible shafts 28 (FIG. 4) is formed by layers of wound wire. Each of the flexible shafts 28 is enclosed by a tubular casing 48. The flexible shaft 28 has a known construction and is commercially available from B.W. Elliott Mfg. Co., LLC having a place of business at 11 Beckwith Avenue, Binghamton, N.Y. 13901. Of course, flexible shafts having a different design and/or available from other commercial sources, may be utilized if desired.

Force is transmitted from the flexible shaft 28 through the coupling assembly 34 to the actuator assembly 32. The coupling assembly 34 may be connected with the flexible shaft 28 and subsequently connected to the actuator assembly 32. This would enable the flexible shaft and coupling assembly 34 to be provided as a unit.

Figure 4:
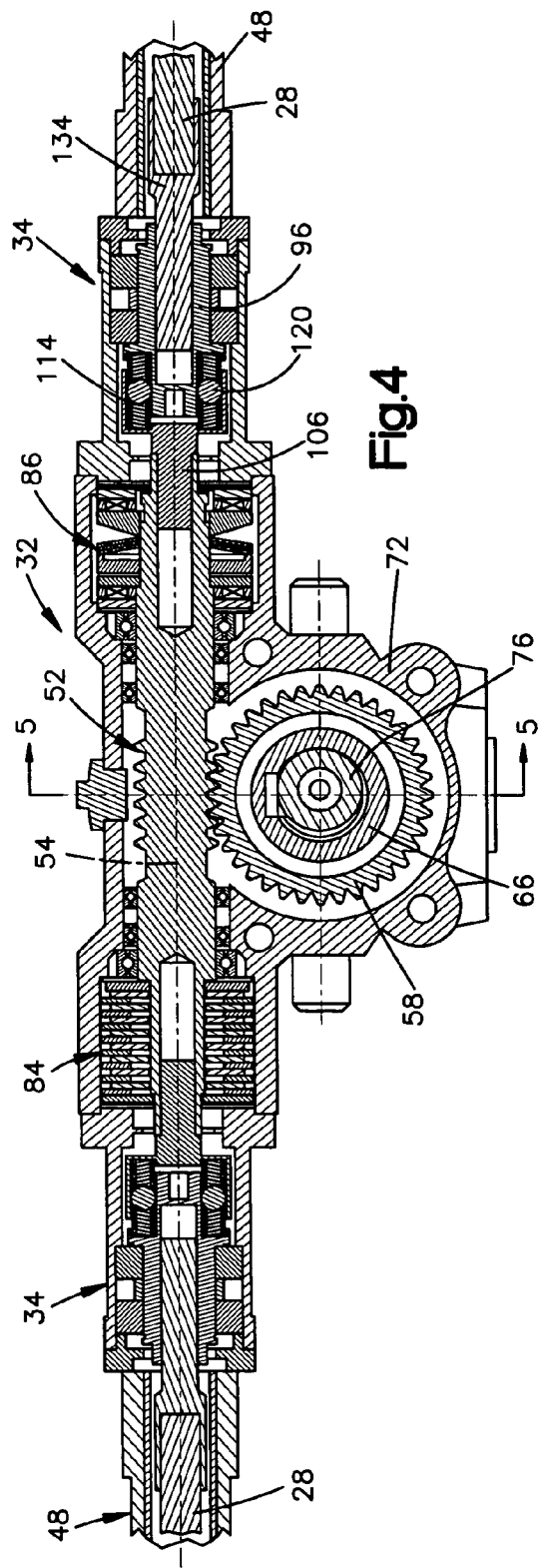
FIG. 4 is a schematic sectional view illustrating the manner in which an actuator assembly of FIG. 3 is connected with a pair of flexible drive shafts by a pair of coupling assemblies.

The actuator assembly 32 includes a worm gear 52 (FIG. 4). The worm gear 52 is connected with the coupling assembly 34. The worm gear 52 is rotatable about an axis 54 which is coincident with a longitudinal central axis of the coupling assembly 34 and a longitudinal central axis of the flexible shaft 28.

Figure 5:
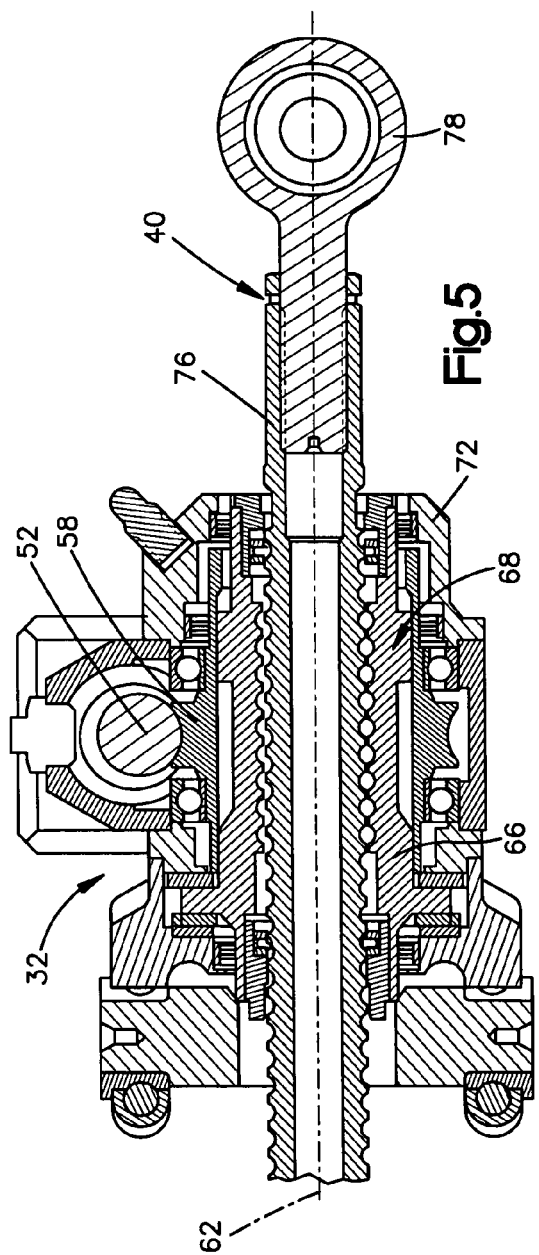
FIG. 5 is a schematic sectional view, taken generally along the line 5-5 of FIG. 4, illustrating the relationship between the actuator assembly of FIG. 3 and the force transmission apparatus.

The worm gear 52 (FIG. 4) is disposed in meshing engagement with a worm wheel 58. The worm wheel 58 is rotatable about an axis 62 (FIG. 5) which extends perpendicular to the axis 54 (FIG. 4) about which the worm gear 52 is rotatable. The worm wheel 58 is fixedly connected to a nut 66 in a ball nut assembly 68 (FIG. 5). The nut 66 is rotated by the worm wheel 58 about the axis 62. A housing 72 encloses the ball nut assembly 68, worm wheel 58 and worm gear 52.

The force transmission apparatus 40 includes an externally threaded member 76 (FIG. 5) which extends into the housing 72. The externally threaded member 76 has a longitudinal central axis which is coincident with the axis 62 about which the nut 66 is rotated during rotation of the worm wheel 58. The externally threaded member 76 is connected with the nut 66 by a plurality of balls which engage an internal thread convolution on the nut 66 and an external thread convolution on the externally threaded member. The externally threaded member 76 is connected with the control surface 38 (FIG. 3) by a force transmitting member 78 (FIG. 5).

When the force transmission apparatus 40 encounters excessive resistance to movement of the aircraft control surface 38, the interaction between the worm wheel 58 and worm gear 52 shifts the worm gear axially toward either the left or right (as viewed in FIG. 4) depending upon the direction in which the worm wheel 58 is being rotated by the worm gear 52. Thus, when the worm wheel 58 is being rotated in a clockwise direction (as viewed in FIG. 4) the worm gear 52 is moved toward the left (as viewed in FIG. 4), when the force transmission apparatus 40 encounters excessive resistance to movement of the control surface 58. Similarly, when the worm wheel 58 is being rotated in a counterclockwise direction (as viewed in FIG. 4) the worm gear 52 is moved toward the right (as viewed in FIG. 4) when the force transmission apparatus 40 encounters excessive resistance to movement of the control surface 38. Axial movement of the worm gear 52 toward either the left or the right (as viewed in FIG. 4) is effective to operate a brake assembly 84 to retain the worm gear against rotation and interrupt rotation of the worm wheel 58 and flexible drive shafts 28 connected to opposite ends of the worm gear by identical coupling assemblies 34.

The worm gear 52 is normally maintained in an initial position (FIG. 4), in which it is centered relative to the worm wheel 58, by a spring assembly 86. The spring assembly 86 contains Belleville disc springs which urge the worm gear 52 to the initial position. When the worm gear 52 shifts toward either the right or left against the influence of the spring assembly 86, friction discs in a brake assembly 84 are pressed together to retard rotation of the worm gear. The friction discs in the brake assembly 84 are pressed together by force transmitted from a left (as viewed in FIG. 4) end portion of the worm gear 52.

It should be understood that two flexible drive cables 28 (FIG. 4) are associated with each of the actuator assemblies 32 (FIGS. 1 and 2). However, the last actuator assembly 32 in a series of actuator assemblies operated by power from a power drive unit 44 is connected with a single flexible drive cable 28. Each flexible drive cable 28 is connected with an actuator assembly 32 by one of the identical coupling assemblies 34. When the worm gear 52 (FIG. 4) is moved along the axis 54, it is moved toward one of the coupling assemblies 34 and is moved away from the other coupling assembly.

The coupling assemblies 34 are easily operated to accommodate axial movement of the worm gear 52 (FIG. 4) relative to the housing 72. Each coupling assembly 34 (FIG. 6) includes a cylindrical housing 92. The housing 92 is fixedly connected to the actuator assembly housing 72 and to the casing 48 for the flexible shaft 28.

The coupling assembly 34 includes an input member 96 (FIG. 6) having a cylindrical body portion 98 which is rotatably supported in the housing 92 by bearings 100 and 102. In addition, the coupling assembly 34 includes an output member 106 which is fixedly connected to the worm gear 52. The output member 106 has a body portion 108 which is telescopically received in a cylindrical opening 110 in the worm gear 52. The body portion 108 is fixedly connected to the worm gear 52.

The output member 106 (FIG. 6) includes a cylindrical side wall 114 which extends axially outward from an annular flange 116. The flange 116 and side wall 114 are disposed in a coaxial relationship with the worm gear 52 and input member 96. The output member 106 is connected with the input member 96 by a plurality of balls 120.

The spherical balls 120 are rotatable about their centers of curvature to facilitate axial movement of the worm gear 52 and output member 106 relative to the input member 96 and flexible shaft 28. The balls 120 are received in linear grooves 124 (FIGS. 7 and 8) formed in the side wall 114 of the output member 106. The grooves 124 have longitudinal central axes which extend parallel to the longitudinal central axis 54 (FIG. 6) of the coupling assembly 34.

Figure 6:
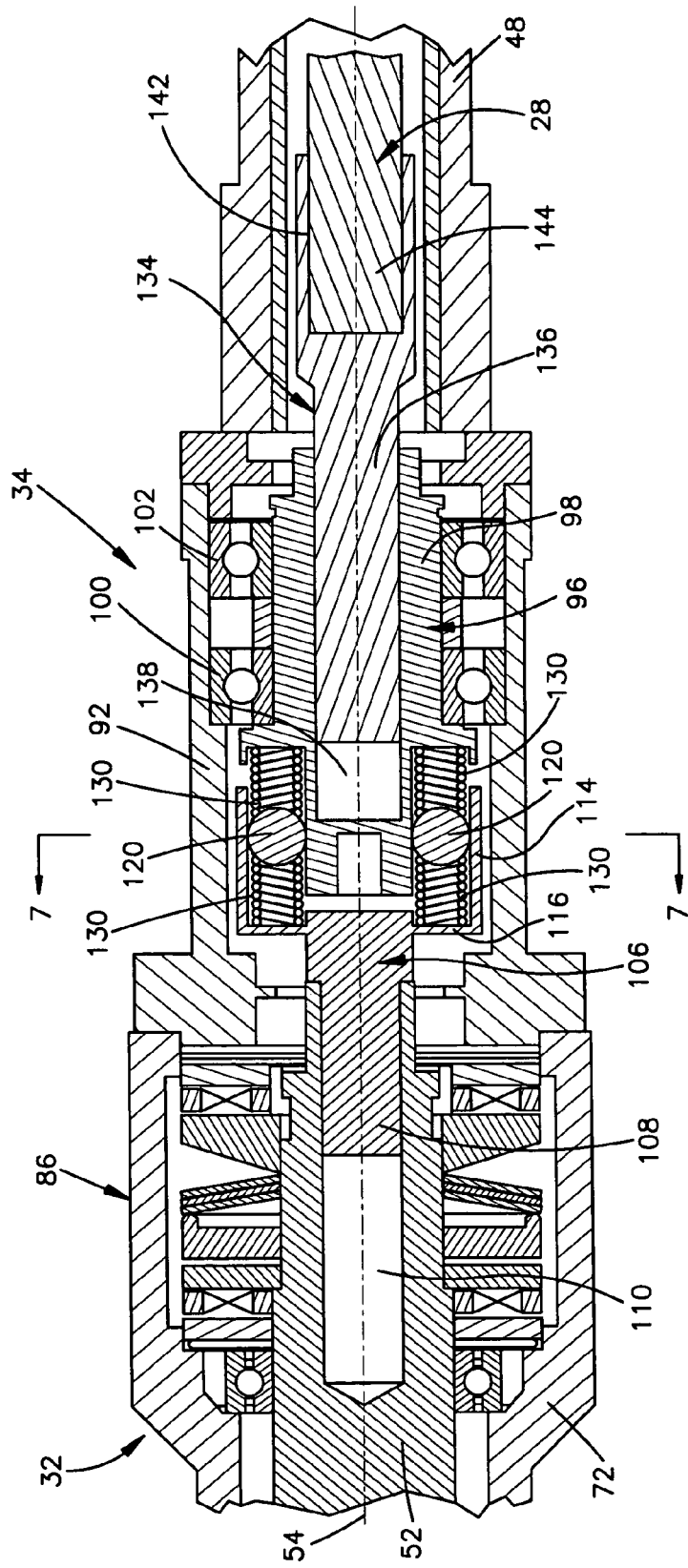
FIG. 6 is an enlarged fragmentary schematic sectional view further illustrating the relationship between a flexible drive shaft, coupling assembly, and actuator assembly of FIGS. 3 and 4.

In addition, the balls 120 (FIG. 7) engage linear grooves 128 (FIGS. 7 and 9) formed in the input member 96. The grooves 128 extend parallel to the grooves 124 in the output member 106. The grooves 124 and 128 in the input and output members 96 and 106 extend parallel to the coincident central axis 54 of the worm gear 52, output member 106 and input member 96 (FIG. 6). The balls 120 can roll along the grooves 124 and 128. A plurality of springs 130 are provided to urge the balls 120 toward positions in which they are centered in the grooves 124 and 128.

The flexible shaft 28 is connected with the input member 96 by a ferrule or connector member 134 (FIG. 6). The ferrule 134 has an end portion 136 which is telescopically received in an opening 138 (FIG. 6) formed in the input member 96. The end portion 136 of the ferrule 134 is fixedly connected to the input member 96. The ferrule 134 has a cylindrical side wall 142 which is fixedly connected to and extends around an end portion 144 of the flexible shaft 28.

During normal operation of the aircraft, the power drive unit 44 (FIGS. 1 and 2) may be operated to rotate the flexible shaft 28 about its longitudinal central axis. Rotation of the flexible shaft 28 is transmitted to the input member 96 (FIG. 6) to rotate the input member about the axis 54. Rotational force (torque) is transmitted from the input member 96 to the output member 106 by the balls 120. Rotation of the output member 106 rotates the worm gear 52 about the axis 54 (FIG. 4).

Rotation of the worm gear 52 rotates the worm wheel 58. The nut 66 (FIG. 5) rotates with the worm wheel 58. Rotation of the nut 66 in the ball nut assembly 68 is effective to move the externally threaded member 76 in the force transmission apparatus 40 axially relative to the nut. As this occurs, the force transmission apparatus 40 is actuated to move the control surface 38 (FIG. 3). The control surface 38 may be a flap 16 or slat 22 on a wing of the aircraft. Alternatively, the control surface 38 may be located on a different portion of the aircraft.

In the event of the occurrence of excessive resistance to movement of the aircraft control surface 38 by the force transmission apparatus 40, rotation of the nut 66 in the ball nut assembly 68 (FIG. 5) is retarded. This results in rotation of the worm wheel 58 being retarded. When rotation of the worm wheel 58 is retarded, the worm gear 52 is moved by the interaction between the teeth of the worm gear and the worm wheel.

Figure 9:
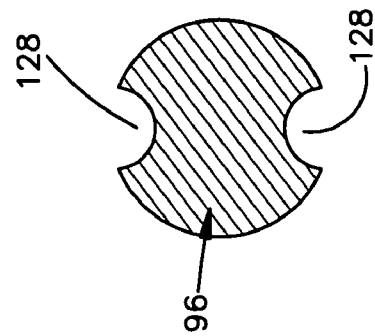
FIG. 9 is a schematic sectional view of an input member of the coupling assembly of FIG. 7.
Figure 8:
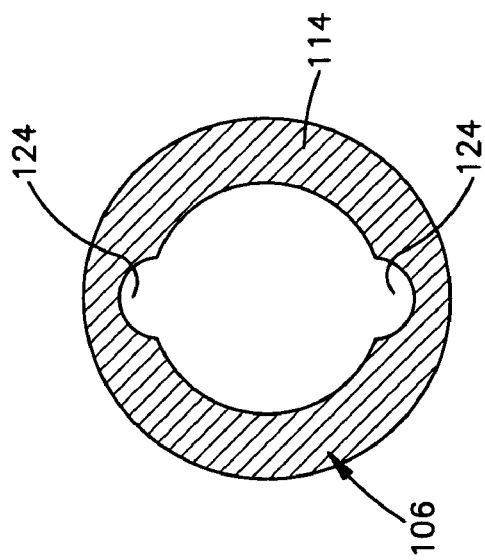
FIG. 8 is a schematic sectional view of an output member of the coupling assembly of FIG. 7.
Figure 7:
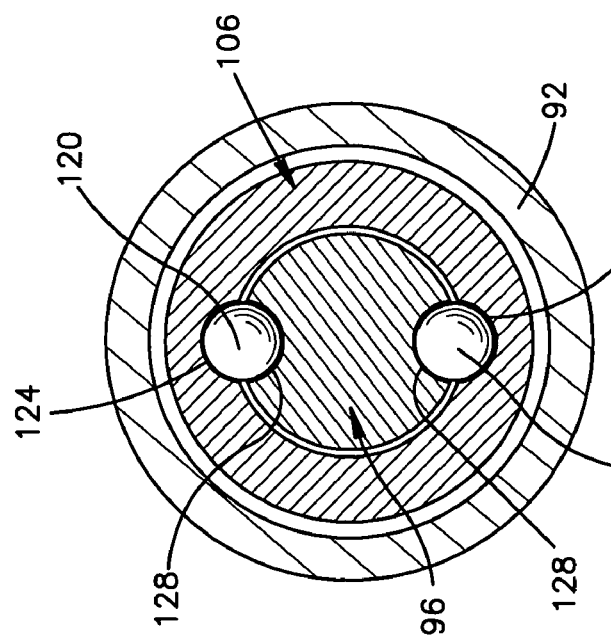
FIG. 7 is a schematic sectional view, taken generally along the line 7-7 of FIG. 6, further illustrating the construction of the coupling assembly.

Assuming that the worm gear 52 is attempting to rotate the worm wheel 58 in a clockwise direction (as viewed in FIG. 4), the worm gear 52 is shifted toward the left. Leftward (as viewed in FIG. 4) movement of the worm gear 52 compresses the spring assembly 86 and operates the brake assembly 84 from a disengaged condition to an engaged condition to further retard rotation of the worm gear. The leftward movement of the worm gear 52 is accommodated by the coupling assembly 34. As the worm gear 52 moves toward the left (as viewed in FIG. 4), the output member 106 is moved toward the left with the worm gear. As this occurs the balls 120 (FIG. 6) roll along the grooves 124 and 126 in the output member 106 and input member 96 (FIGS. 7-9).

The spherical balls 120 are relatively easy to roll along the grooves 124 and 128. Therefore, there is little or no resistance to axial movement of a worm gear 52.

In view of the foregoing description, it is apparent that the present invention provides a new and improved apparatus 10 for use in moving a control surface 38 during operation of an aircraft. The apparatus 10 includes a flexible drive shaft 28 which may be connected with an actuator assembly 32. A force transmission apparatus 40 may be provided to transmit force from the actuator assembly 32 to the control surface 38. A coupling assembly 34 is provided to interconnect the flexible drive shaft 28 and the actuator assembly 32.

The coupling assembly 34 includes an input member 96 which is connected with the flexible drive shaft 28. The coupling assembly 34 also includes an output member 106 which may be connected with the actuator assembly 32. A plurality of balls 120 interconnect the input and output members 96 and 106 and are rotatable to accommodate relative movement between the input and output members.

Having described the invention, the following is claimed:

1. An apparatus for use in moving a control surface during operation of an aircraft, said apparatus comprising an actuator assembly which is connected with the control surface by a force transmission apparatus, a flexible drive shaft which is rotatable about a longitudinal central axis of said flexible drive shaft, and a coupling assembly which interconnects said flexible drive shaft and said actuator assembly, said coupling assembly includes an input member connected with said flexible drive shaft, an output member connected with said actuator assembly, and a plurality of balls which interconnect said input and output members and are rotatable to accommodate relative movement between said input and output members, said actuator assembly includes a worm gear which is connected with said input member of said coupling assembly and is rotated by said input member of said coupling assembly upon rotation of said flexible drive shaft and a worm wheel which is disposed in meshing engagement with said worm gear, said worm wheel being rotatable under the influence of force transmitted from said flexible drive shaft through said coupling assembly and said worm gear to said worm wheel to actuate said force transmission apparatus to move the control surface.

2. An apparatus as set forth in claim 1 wherein a first one of said input and output members includes a circular wall which extends around a second one of said input and output members, said wall of said first one of said input and output members at least partially defines a first groove which extends from a first end portion of said wall to a second end portion of said wall, said second one of said input and output members having a first end portion which is telescopically received in a chamber which is at least partially defined by said wall of said first one of said input and output members, said first end portion of said second one of said input and output members at least partially defining a second groove, said outer surface of at least one of said balls of said plurality of balls being disposed in engagement with said first and second grooves.

3. An apparatus as set forth in claim 1 wherein said flexible drive shaft is formed by layers of wound wire, said flexible drive shaft being enclosed by a casing which is connected with a housing for said actuator assembly.

4. An apparatus as set forth in claim 1 further including a connector member which extends around an end portion of said flexible drive shaft and is at least partially enclosed by said input member, said connector member being retained against rotation relative to said flexible drive shaft and said input member to enable said connector member to transmit torque between said flexible drive shaft and said input member.

5. An apparatus as set forth in claim 1 wherein said worm gear is movable along a central axis of said coupling assembly upon occurrence of excessive resistance to movement of the aircraft control surface by said force transmission apparatus, said output coupling member being movable along the central axis of said coupling assembly under the influence of force transmitted from said worm gear to said output coupling member upon movement of said worm gear along the central axis of said coupling assembly.

6. An apparatus as set forth in claim 5 wherein said plurality of balls roll relative to at least one of said input and output members of said coupling assembly upon movement of said output coupling member along the central axis of said coupling assembly.

7. An apparatus as set forth in claim 1 wherein said worm gear is axially movable by said output coupling member along a central axis of said coupling assembly upon occurrence of excessive resistance to movement of the aircraft control surface, said output coupling member being movable along the central axis of said coupling assembly under the influence of force transmitted from said worm gear to said output coupling member upon movement of said worm gear along the central axis of said coupling assembly.

8. An apparatus as set forth in claim 7 wherein said plurality of balls roll relative to at least one of said input and output members of said coupling assembly upon movement of said output coupling member along the central axis of said coupling assembly.

9. An apparatus as set forth in claim 1 wherein said actuator assembly includes a ball nut which is connected with said worm wheel and said force transmission apparatus, said force transmission apparatus includes an externally threaded member which is engaged by said ball nut.

10. An apparatus as set forth in claim 1 wherein said actuator assembly includes a brake assembly which is connected with said worm gear and is operable to retard rotation of said worm gear upon occurrence of excessive resistance to movement of the aircraft control surface by said force transmission apparatus.

11. An apparatus for use in moving a control surface during operation of an aircraft, said apparatus comprising a flexible drive shaft which is rotatable about a longitudinal central axis of said flexible drive shaft to transmit power to operate an actuator assembly connected with the aircraft control surface by a force transmission apparatus to move the control surface relative to the aircraft, and a coupling assembly having input and output force transmitting members which are in interconnected for rotation about a drive axis by a plurality of balls, each of said balls of said plurality of balls having an outer surface which is disposed in engagement with a surface on said input force transmitting member and a surface on said output force transmitting member, said input force transmitting member being directly connected with and rotatable with said flexible drive shaft about said drive axis during transmission of power to operate the actuator assembly and force transmission apparatus to move the control surface relative to the aircraft, said input force transmitting member being retained against movement along said drive axis and being effective to apply force against said plurality of balls during transmission of power to operate the actuator assembly and force transmission apparatus to move the control surface relative to the aircraft, said output force transmitting member being connectable with the actuator assembly and rotatable about said drive axis under the influence of force transmitted from said input force transmitting member to said output force transmitting member through said plurality of balls during transmission of power to operate the actuator assembly and force transmission apparatus to move the control surface relative to the aircraft, said output force transmitting member being movable relative to said input force transmitting member along said drive axis under the influence of force transmitted from the actuator assembly upon occurrence of excessive resistance to movement of the aircraft control surface by the force transmission apparatus.

12. An apparatus as set forth in claim 11 wherein said flexible drive shaft is formed by layers of wound wire, said flexible drive shaft being enclosed by casing which is connected with a housing for the actuator assembly.

13. An apparatus as set forth in claim 11 wherein a first one of said input and output members includes a circular wall which extends around a second one of said input and output members, said wall of said first one of said input and output members at least partially defines a first groove which extends from a first end portion of said wall to a second end portion of said wall, said second one of said input and output members having a first end portion which is telescopically received in a chamber which is at least partially defined by said wall of said first one of said input and output members, said first end portion of said second one of said input and output members at least partially defining a second groove, said outer surface of at least one of said balls of said plurality of balls being disposed in engagement with said first and second grooves.

* * * * *